United States Patent [19]
Harvey et al.

[11] Patent Number: 5,093,553
[45] Date of Patent: Mar. 3, 1992

[54] HYDROGEN CONCENTRATION DETECTION IN WELD ARC PLASMA

[75] Inventors: Dennis N. Harvey, Victoria, Minn.; Rosemarie Reilly, Bloomfield Hills, Mich.

[73] Assignee: General Dynamics Land Systems, Inc., Warren, Mich.

[21] Appl. No.: 709,897

[22] Filed: Jun. 4, 1991

[51] Int. Cl.[5] .............................................. B23K 9/095
[52] U.S. Cl. ............................. 219/130.01; 356/313; 385/115
[58] Field of Search ................. 219/130.01, 130.21, 219/74; 356/313; 350/96.24

[56] References Cited

U.S. PATENT DOCUMENTS

| | | |
|---|---|---|
| 3,271,558 | 9/1966 | Davis . |
| 3,526,748 | 9/1970 | Rienks . |
| 3,611,805 | 10/1971 | Hishikari . |
| 3,666,949 | 5/1972 | DeFalco et al. . |
| 4,359,622 | 11/1982 | Dostoomian et al. . |
| 4,375,026 | 2/1983 | Kearney . |
| 4,399,346 | 8/1983 | Kearney . |
| 4,446,354 | 5/1984 | Kearney . |
| 4,484,059 | 11/1984 | Lillquist . |
| 4,609,810 | 9/1986 | O'Brien et al. . |
| 4,614,868 | 9/1986 | Alster . |
| 4,784,491 | 11/1988 | Penney et al. . |
| 4,788,410 | 11/1988 | Grau et al. . |
| 4,920,249 | 4/1990 | McLaughlin et al. . |

FOREIGN PATENT DOCUMENTS

| | | |
|---|---|---|
| 1912344 | 6/1971 | Fed. Rep. of Germany . |
| 238267 | 8/1986 | German Democratic Rep. ................ 219/130.01 |
| 2045473 | 10/1980 | United Kingdom . |
| 2151777 | 7/1985 | United Kingdom ........... 219/130.01 |

Primary Examiner—Clifford C. Shaw
Attorney, Agent, or Firm—Brooks & Kushman

[57] ABSTRACT

An optical input apparatus (10) for use with a weld evaluation monitor (14) to determine the concentration of hydrogen in a weld arc atmosphere (62) including weld arc plasma and shield gas is disclosed as including an optical fiber bundle (16) having a single optical input (18) and a plurality of optical outputs (22). The optical fiber bundle is disposed to receive, at its optical input, electromagnetic radiation emitted from the weld arc atmosphere and, because the optical fiber bundle has an individual optical fiber path distribution that is completely randomized, to communicate proportional amount of the radiation to each of its optical outputs independent of the angular disposition of the fiber bundle. Radiation having only specific wavelengths of hydrogen, shield gas and background emissions are allowed to pass through respective optical line filters (56) to associated optical transducers (58), which generate electrical output signals having amplitudes representative of the intensities of the hydrogen, shield gas and background emissions. Also disclosed is a signal processing module (12) for receiving the electrical output signals and determining therefrom the hydrogen concentration in the weld arc atmosphere. A method for using the apparatus to determine the hydrogen concentration is also disclosed.

14 Claims, 2 Drawing Sheets

HYDROGEN CONCENTRATION DETECTION IN WELD ARC PLASMA

TECHNICAL FIELD

This invention relates to the use of a single input, branched output, optical fiber bundle having a completely randomized fiber path distribution to collect and transmit weld arc radiation to a spectrograph to determine the concentration of hydrogen in a weld arc plasma.

BACKGROUND ART

It has been known for some time that hydrogen, commonly dissociated by heat from the vapors of such hydrogen-bearing sources as water, lubricants and electrode coatings, can be absorbed by metal melted during an arc welding operation and that this often results in brittle and cracked welds, especially in high-strength steels. Experiments using weld arc electrodes and plates made of certain materials have indicated that the amount of hydrogen absorbed is proportional to that in the atmosphere surrounding a weld arc and that cracking is likely to occur when the hydrogen content of a weld arc shield gas exceeds a threshold amount, for example, 0.25 percent. Special electrodes and welding procedures have been developed in an attempt to minimize the amount of hydrogen in the atmosphere surrounding a weld arc, but a great number of welds must still be inspected after being made. Such inspections are costly and time consuming, as are the repairs required and the waste caused by faulty welds.

At least one electro-optically based system has been developed to monitor the hydrogen content of weld arcs during weld operations. Such a system is described in an article, incorporated herein by reference, titled "Spectroscopic Measurement of Hydrogen Contamination in Weld Arc Plasmas" by J. E. Shea and C. S. Gardner in the *Journal of Applied Physics*, Volume 54, No. 9, September 1983.

The system described is based on the fact that the intensity of electromagnetic radiation emitted by weld arc plasma at wavelengths corresponding to atomic transitions of hydrogen is proportional to the concentration of hydrogen in the weld plasma. It is thus possible to infer the amount of hydrogen absorbed by metal melted during a welding operation by monitoring the radiation at hydrogen emission wavelengths.

Since a portion of the radiation from the weld arc is absorbed by smoke and particulate matter in the atmosphere, not all the radiation reaches the monitor. Moreover, the intensity of radiation received by the monitor depends critically on the alignment of the optical system used to collect the radiation. Even small alignment or focusing errors cause significant variations in the monitored radiation intensity. The problem caused by the intensity variations due to random factors is minimized by a normalization procedure that compares the spectral line intensities of two elements having similar excitation energies. This reduces temperature dependence; and other wavelength-dependent factors affect both spectral lines equally, the ratio between their spectral line intensities remaining substantially constant for given concentrations of the two elements.

In the system described, argon was used as a shield gas. It was found that the ratio of radiation intensities of the hydrogen Balmer series alpha emission line at 6563 Angstroms and the argon emission line at 6965 Angstroms approximated a linear function of hydrogen concentration in the weld arc plasma. This made it possible to determine the amount of hydrogen absorbed by metal melted during a welding operation by monitoring the radiation at hydrogen emission wavelengths. The technique was found to have an error of less than ten percent when measuring hydrogen concentrations as low as 0.25 percent by volume. It was also found to be applicable when shield gases other than argon were used provided the shield gas radiated an emission line suitable for comparison with the hydrogen line.

The system described uses a lens to focus radiation from a weld arc onto the input end of a metal-clad, optical-fiber bundle, which guides the radiation to the entrance slit of a monochromator. A parabolic input mirror focuses the radiation from the entrance slit onto a diffraction grating, and the radiation dispersed thereby is focused by another mirror onto a photodiode array. A desired portion of the spectrum is projected onto the photodiode array by adjusting the angle of the diffraction grating with respect to the optical axis of the input mirror. Radiation reaching the photodiode array is integrated thereby for a specific period. Voltages representing the optical energy integrated by the array, and voltages from other transducers representing arc welder current, voltage and travel speed are output to a computer that controls data acquisition and computes integrated emission line intensities.

In addition to spectral emission lines, optical spectra contain background emissions resulting from black-body radiation. Black-body radiation being a function of temperature, the primary sources of black-body radiation are the weld arc plasma and the hot base metal. An additional source is a function of the bias level of the photodiode array. A background level is determined by averaging over a 10-Angstrom bandwidth centered at 6800 Angstrom. Before integrated emission line intensities are computed, the background emission level is subtracted from the entire spectrum.

Another, more economically feasible, system is suggested in the incorporated article. In the described system, optical interference filters and photodetectors are used to measure the appropriate emission line intensities.

A number of patents disclose apparatuses and methods related to optical monitoring. These include U.S. Pat. Nos. 3,271,558; 3,526,748; 3,611,805; 3,666,949; 4,339,346; 4,359,622; 4,375,026; 4,446,354; 4,484,059; 4,609,810; 4,614,868; 4,784,491; 4,788,410; and 4,920,249. Also included are German Patent Number 1,912,344 and British Patent Number 2,045,473 A.

While each of the apparatuses and methods disclosed in the foregoing functions with a certain degree of efficiency, none disclose the advantages of the improved monitor of the present invention as is hereinafter more fully described.

DISCLOSURE OF THE INVENTION

An object of the present invention is to provide, for use with a weld evaluation monitor for determining the concentration of hydrogen in a weld arc atmosphere, an optical input apparatus including an optical fiber bundle that is minimally sensitive to optical axis alignment.

Another object of the present invention is to provide an optical input apparatus including an optical fiber bundle, having a single input and a branched output, that is minimally sensitive to bundle rotation.

Yet another object of the present invention is to provide an optical input apparatus including an optical fiber bundle having a single input and a branched output that distributes weld arc radiation proportionally to each output.

Still another object of the present invention is to provide an optical input apparatus including an optical fiber bundle, having a single input and a branched output, that requires no lens through which radiation is focused onto the input of the bundle.

Another object of the present invention is to provide an optical input apparatus including an optical fiber bundle, having a single input and a branched output, that is effectively protected from weld arc heat.

Yet another object of the present invention is to provide an optical input apparatus, including an optical fiber bundle having a single input and a branched output, that includes a manifold to ensure the alignment of the outputs with various other optical elements of the apparatus.

In realizing the aforementioned and other objects, the optical input apparatus of the present invention includes an optical fiber bundle having a single optical input at an input end thereof and a plurality of optical outputs at a branched, output end. The path distribution of the optical fibers of the bundle is completely randomized so that radiation entering the optical input is proportionally distributed to each of the optical outputs, minimizing sensitivity to bundle rotation.

The optical input of the optical fiber bundle is secured within an optical input housing, which is disposable near an arc welding site. A flat window is also mounted within the optical input housing. The flat window and the optical input of the optical fiber bundle each has an optical axis; and they are aligned, the flat window being disposed between the arc welding site and the optical input.

A heat reflecting mirror is secured within the optical input housing between the flat window and the optical input of the optical filter bundle. The heat reflecting mirror protects the input end of the optical fiber bundle by ensuring that its temperature is maintained below 800 degrees Fahrenheit (430 degrees Celsius). The flat window prevents material splattered from the arc welding site from contacting the heat reflecting mirror and minimizes optical alignment sensitivity. The mirror has an optical axis, and it is aligned with those of the flat window and the optical input. The mirror has optical characteristics that enable it to reflect a substantial amount of near-infrared radiation having wavelengths greater than 7000 Angstroms. This includes substantial amounts of heat generated by an arc welding operation. The mirror transmits a substantial amount of weld arc radiation having wavelengths between 6000 and 7000 Angstroms.

The plurality of optical outputs of the branched, or output, end of the optical fiber bundle are secured to an optical output manifold disposed within an optical output housing. A like plurality of optical line filters are mounted within the optical output housing. The optical outputs and the line filters each have an optical axis. The optical axis of one optical output is aligned with that of one line filter, and the adjacent surfaces of each mutually aligned optical output and line filter are maintained in contact.

The preferred embodiment of the optical input apparatus of the present invention includes first, second and third optical line filters. The first optical line filter passes radiation having a wavelength of the Hydrogen Balmer series alpha line, that is, 6563 Angstroms (656.3 nanometers). The second optical line filter passes radiation having a wavelength selected to have an emission level representing an average background radiation level, for example, 6800 Angstroms (680.0 nanometers). The third optical line filter passes radiation having a wavelength in the effective emission range of the shield gas, for example, 6965 Angstroms (696.5 nanometers) for argon.

First, second and third optical transducers are also disposed within the optical output manifold. Each optical transducer has an optical axis. The optical axis of one optical transducer is aligned with that of one line filter, and the adjacent surfaces of each mutually aligned optical transducer and line filter are maintained in contact. Each of the optical transducers generates an electrical output signal in response to weld arc radiation received, and the amplitude of each electrical output signal is representative of the intensity of the weld arc radiation at the wavelength passed by the line filter aligned with that transducer.

A weld evaluation monitor for determining the concentration of hydrogen in a weld arc atmosphere includes a signal processing module electrically connected to the optical transducers of the optical input apparatus to receive the electrical output signals therefrom and to compare the signals and estimate the amount of hydrogen absorbed in the materials melted during the weld operation.

The objects, features and advantages of the present invention are readily apparent from the following detailed description of the best mode for carrying out the invention when taken in connection with accompanying drawings.

BRIEF DESCRIPTION OF DRAWINGS

In the drawings, in which like reference characters indicate corresponding parts in all the views.

BEST MODE FOR CARRYING OUT THE INVENTION

Figure 1:
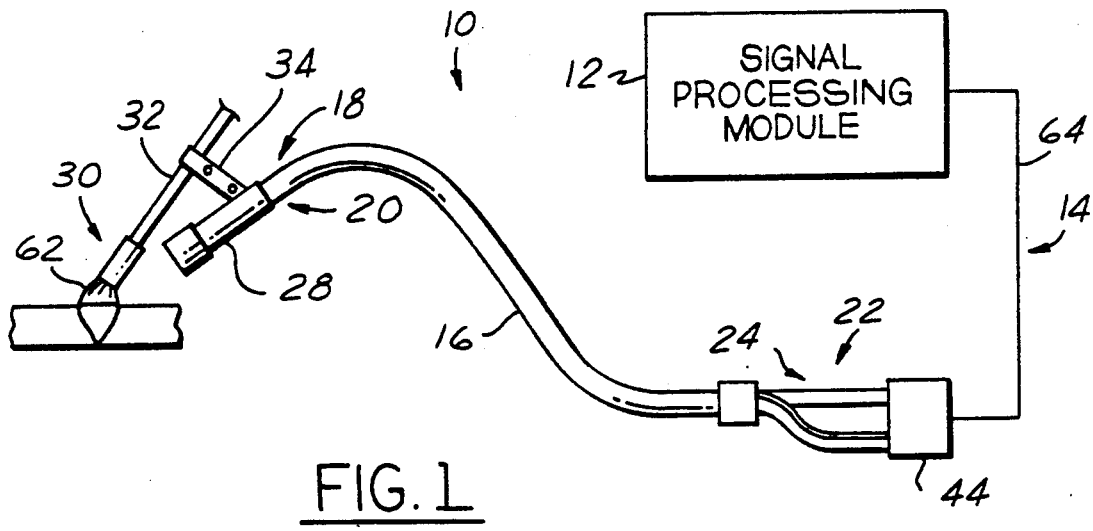
FIG. 1 is a side view, partly diagrammatic, of a weld evaluation monitor including an optical input apparatus embodying features of the invention.

With reference to FIG. 1 of the drawings, an optical input apparatus constructed in accordance with the present invention is generally indicated by reference numeral 10 and is shown connected to a signal processing module 12 to form, in combination therewith, a weld evaluation monitor, generally indicated by reference numeral 14. The optical input apparatus 10 includes an optical fiber bundle 16 having a single optical input, generally indicated by reference numeral 18, at an input end thereof, generally indicated by reference numeral 20, and a plurality of optical outputs, generally indicated by reference numeral 22, at a branched, output end, generally indicated by reference numeral 24. In the preferred embodiment of the invention, there are three optical outputs 22. The path distribution of the optical fibers of the optical fiber bundle 16 is completely randomized so that radiation entering the optical input 18 is proportionally distributed to each of the optical outputs 22, minimizing sensitivity to bundle rotation.

Figure 2:
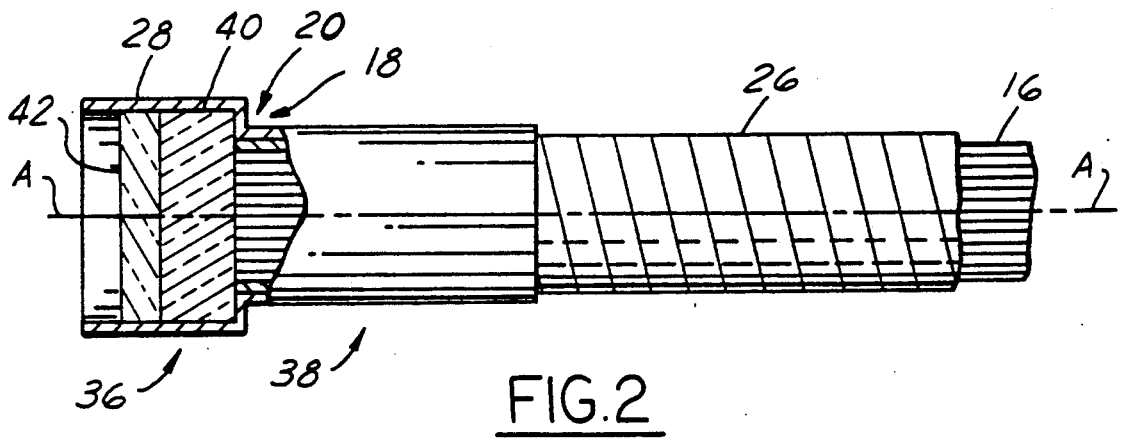
FIG. 2 is a side view, partly broken away and in section, of a portion of the optical input apparatus, including an optical input housing and elements normally disposed therein, embodying features of the invention.

As best shown by FIG. 2 of the drawings, the optical fiber bundle 16 is sheathed in a flexible metal sleeve 26 for protection. The input end 20 of the optical fiber bundle 16 is mounted within an optical input housing 28, which is disposable near an arc welding site, generally indicated by reference numeral 30 (FIG. 1) by, for example, being secured to an arc welding electrode support member 32 by a mounting bracket 34.

The optical input housing 28 is formed as a stepped tube. The optical input housing 28 has an input portion, generally indicated by reference numeral 36, and an output portion, generally indicated by reference numeral 38, the inside diameter of the input portion 36 being larger than that of the output portion 38. The input end 20 of the optical fiber bundle 16 occupies and is secured within the output portion 38 of the optical input housing 28. A heat reflecting mirror 40 is secured within the input portion 36 of the optical input housing 28 adjacent the optical input 18 of the optical fiber bundle 16. A flat window 42 is secured within the input portion 36 of the optical input housing 28 adjacent the heat reflecting mirror 40.

The flat window 42, the heat reflecting mirror 40 and the optical input 18 of the optical fiber bundle 16 each has an input optical axis A; and they are maintained in alignment within the optical input housing 28. The flat window 42 prevents material splattered from the arc welding site 30 (FIG. 1) from contacting the heat reflecting mirror 40 and minimizes optical alignment sensitivity.

The heat reflecting mirror 40 protects the input end 20 of the optical fiber bundle 16 by ensuring that its temperature is maintained below 800 degrees Fahrenheit (430 degrees Celsius). The mirror 40 has optical characteristics that enable it to reflect a substantial amount of near-infrared radiation having wavelengths greater than 7000 Angstroms. This includes substantial amounts of heat generated at the arc welding site 30. The mirror 40 transmits a substantial amount of weld arc radiation having wavelengths between 6000 and 7000 Angstroms.

Figure 3:
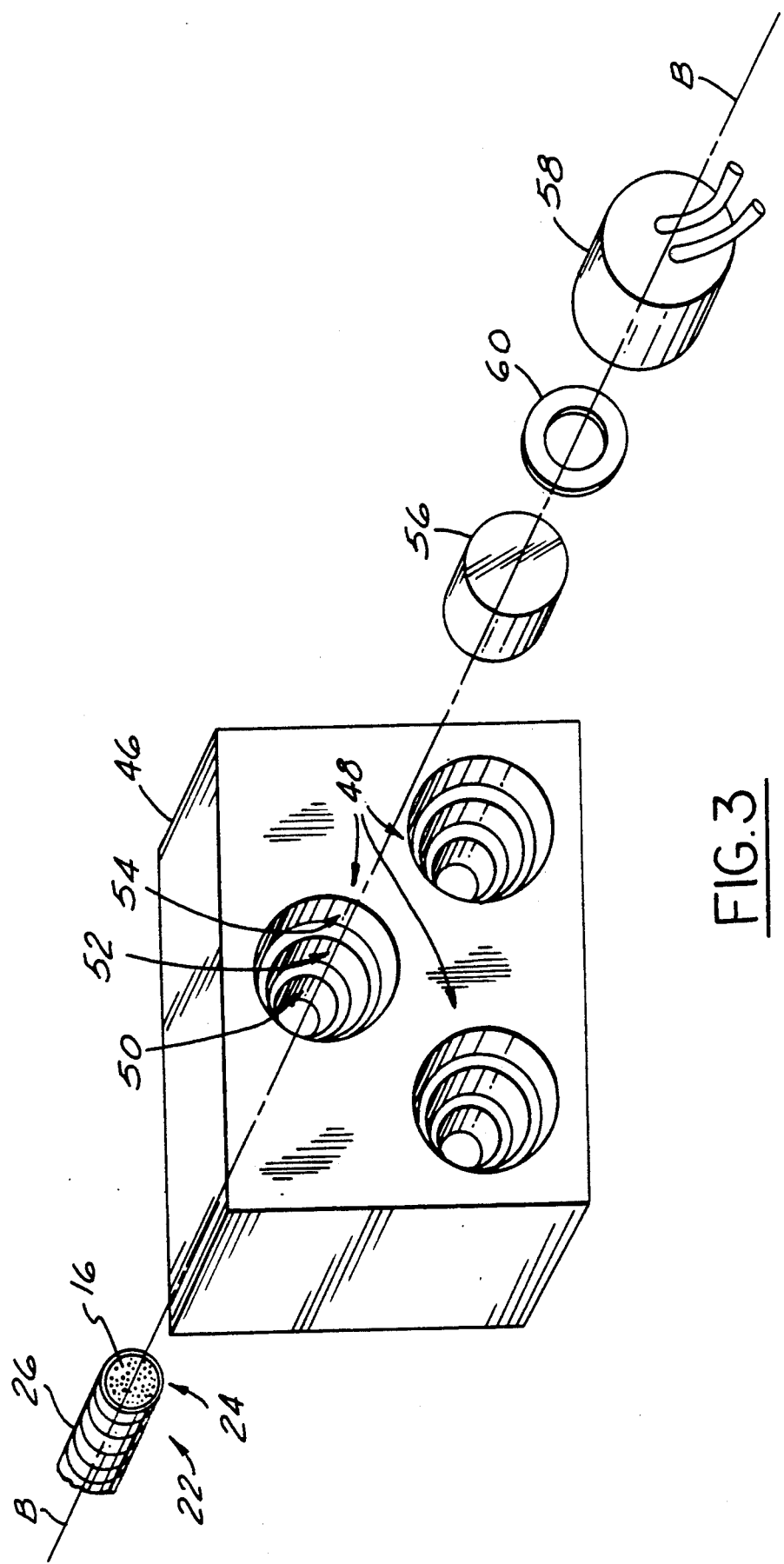
FIG. 3 is a perspective, exploded view of a portion of the optical input apparatus, including an optical output manifold and elements normally disposed therein, embodying features of the invention.

The three optical outputs 22 of the branched, or output, end 24 of the optical fiber bundle 16 are secured within an optical output housing 44 (FIG. 1). As best illustrated by FIG. 3 of the drawings, the optical output housing (not shown) includes an optical output manifold 46. The manifold 46 defines three mounting apertures, generally indicated by reference numerals 48, disposed therethrough. FIG. 3 shows representative views of two of the mounting apertures 48, only one of the mounting apertures 48 being shown in detail. Each of the mounting apertures 48 is stepped to provide first, second and third portions thereof, the portions being generally indicated by reference numerals 50, 52 and 54 respectively. Each mounting aperture portion has a different diameter, the diameters being progressively larger from the first portion 50 through the third portion 54.

A representative one of three output ends 24 of the optical fiber bundle 16; a representative one of three optical line filters 56; and a representative one of three optical transducers, which, in the preferred embodiment of the invention, to minimize gain variations associated with temperature changes, is a hybrid photodiode 58, are shown in exploded disposition by FIG. 3 and fit respectively into the first, second and third mounting apertures 50, 52 and 54. The optical output 22, optical line filter 56 and hybrid photodiode 58 each has an optical axis B; and these elements are secured within the optical output manifold 46 to maintain the axes in alignment. The optical output manifold 46 also maintains the adjacent surfaces of each mutually aligned optical output 22, line filter 56 and hybrid photodiode 58 in mutual contact.

A representative one of three vignetting filters 60 is also shown in FIG. 3 of the drawings. The vignetting filter 60 is made from an optically opaque material, such as black paper, and is disposed between the optical line filter 56 and the hybrid photodiode 58 to prevent radiation leakage from edges of the former from reaching the latter.

A weld arc produces a surrounding atmosphere 62 (FIG. 1) including weld arc plasma and shield gas. The shield gas is typically argon. Hydrogen is also found in the weld arc atmosphere 62. It is commonly dissociated by heat from the vapors of such hydrogen-bearing sources as water, lubricants and electrode coatings. It can be absorbed by metal melted during an arc welding operation; and this often results in brittle and cracked welds, especially in high-strength steels. The amount of hydrogen absorbed is proportional to that in the atmosphere surrounding a weld arc 62.

A first of the three optical line filters 56, shown by FIG. 3 of the drawings, passes radiation having a wavelength of the Hydrogen Balmer series alpha line, that is, 6563 Angstroms (656.3 nanometers). A second of the three optical line filters 56 passes radiation having a wavelength selected to have an emission level representing an average background radiation level, for example, 6800 Angstroms (680.0 nanometers). A third of the three optical line filters 56 passes radiation having a wavelength in the effective emission range of a shield gas, for example, 6965 Angstroms (696.5 nanometers) for argon. Each of the hybrid photodiodes 58 generates an electrical output signal in response to weld arc radiation received, and the amplitude of each electrical output signal is representative of the intensity of weld arc radiation at the wavelength passed by the line filter aligned with that hybrid photodiode 58. Each of the hybrid photodiodes 58 internally integrates a transconductance amplifier (not shown) to reduce noise and preserve signal integrity.

The weld evaluation monitor 14, shown by FIG. 1 of the drawings, includes a signal processing module 12 electrically connected, by a sensor cable 64, to the hybrid photodiodes 58 (FIG. 3) of the optical input apparatus to receive the electrical output signals therefrom. Background emission levels are subtracted, emission line intensities are computed and normalized, and the hydrogen concentrations in the weld arc atmosphere and in the weld materials are computed by the signal processing monitor 12.

Figure 4:
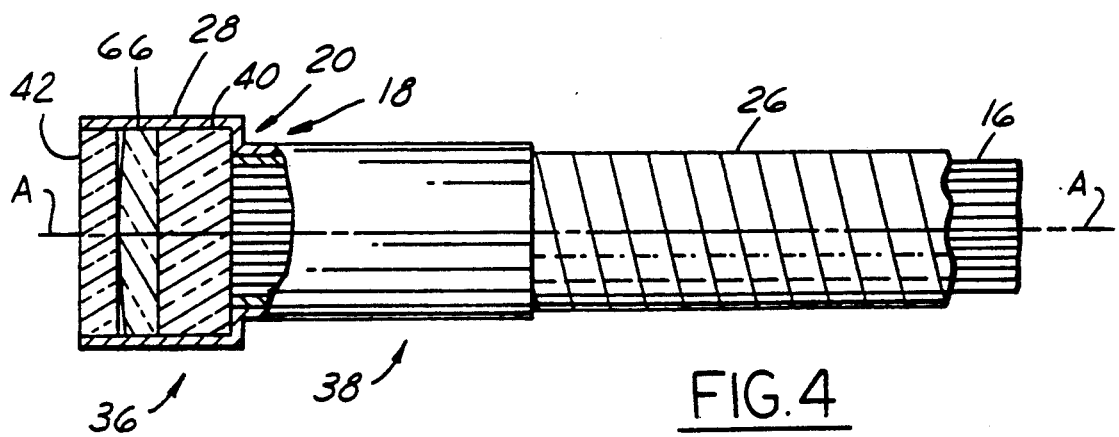
FIG. 4 is a view of the optical input apparatus shown by FIG. 2 and additionally including an optical input lens.

Shown by FIG. 4 is an optical input housing 28 having disposed therein the input end 20 of the optical fiber bundle 16, the heat reflecting mirror 40, and the flat window 42 shown by FIG. 2 and additionally having an optical input lens 66 disposed therein between the heat reflecting mirror 40 and the flat window 42. The optical input lens 66 has an optical axis A that is maintained, by the optical input housing 28, in alignment with the optical axes A of the optical input 18, the heat reflecting mirror 40 and the flat window 42. The optical input lens 66 may be used during low-radiation conditions to enhance the collection of radiation from the weld arc atmosphere 62.

While the best mode for carrying out the invention has been described in detail, those familiar with the art to which this invention relates will recognize various alternative designs and embodiments for practicing the invention as disclosed by the following claims.

What is claimed is:

1. An optical input apparatus for use in a weld evaluation monitor to determine the concentration of hydrogen in a weld arc atmosphere including weld arc plasma and a shield gas, the apparatus comprising:
   an optical input housing disposable near an arc welding site;
   a flat window mounted within the optical input housing, the flat window having an optical axis aligned with the optical axis of the single optical input of the optical fiber bundle, the flat window being disposed between the arc welding site and the input end of the optical fiber bundle to prevent material splattered from the arc welding site from damaging the optical fiber bundle and to minimize optical alignment sensitivity;
   an optical output housing;
   a plurality of optical line filters disposed within the optical output housing, each of the line filters having an optical axis and each of the line filters passing weld arc radiation of a specific wavelength;
   a plurality of optical transducers disposed within the optical output housing, each of the transducers having an optical axis aligned with the optical axis of a different one of the plurality of optical line filters and each of the transducers generating an electrical output signal in response to weld arc radiation passing through an optical line filter, the amplitude of the electrical output signal from each of the transducers being representative of the intensity of the weld arc radiation at the wavelength passed by the line filter aligned with that transducer; and
   an optical fiber bundle having a single optical input at an input end thereof, the single optical input having an optical axis, the optical fiber bundle having a branched output at an output end thereof to provide a plurality of optical outputs, each optical output having an optical axis, the path distribution of the optical fibers of the bundle being completely randomized to uniformly distribute radiation from the single optical input to the plurality of optical outputs and to minimize sensitivity to bundle rotation, the input end of the optical fiber bundle being secured within the optical input housing, the single optical input being aligned to receive weld arc radiation from the arc welding site, the output end of the optical fiber bundle being secured within the optical output housing, the optical axis of each optical output being aligned with the optical axis of a different one of the line filters.

2. A weld evaluation monitor for determining the concentration of hydrogen in a weld arc atmosphere including weld arc plasma and a shield gas, the monitor comprising:
   an optical input housing disposable near an arc welding site;
   a flat window mounted within the optical input housing, the flat window having an optical axis aligned with the optical axis of the single optical input of the optical fiber bundle, the flat window being disposed between the arc welding site and the input end of the optical fiber bundle to prevent material splattered from the arc welding site from damaging the optical fiber bundle and to minimize optical alignment sensitivity;
   an optical output housing;
   a plurality of optical line filters disposed within the optical output manifold, each of the line filters having an optical axis and each of the line filters passing weld arc radiation of a specific wavelength;
   a plurality of optical transducers disposed within the optical output manifold, each of the transducers having an optical axis aligned with the optical axis of a different one of the plurality of optical line filters and each of the transducers generating an electrical output signal in response to weld arc radiation passing through an optical line filter, the amplitude of the electrical output signal from each of the transducers being representative of the intensity of the weld arc radiation at the wavelength passed by the line filter aligned with that transducer;
   an optical fiber bundle having a single optical input at an input end thereof, the single optical input having an optical axis, the optical fiber bundle having a branched output at an output end thereof to provide a plurality of optical outputs, each optical output having an optical axis, the path distribution of the optical fibers of the bundle being completely randomized to uniformly distribute radiation from the single optical input to the plurality of optical outputs and to minimize sensitivity to bundle rotation, the input end of the optical fiber bundle being secured within the optical input housing, the single optical input being aligned to receive weld arc radiation from the arc welding site, the output end of the optical fiber bundle being secured to the optical output manifold, the optical axis of each optical output being aligned with the optical axis of a different one of the line filters; and
   a signal processing module electrically connected to each of the optical transducers to receive the electrical output signals therefrom and to compare them to a reference signal representative of the shield gas to determine the concentration of hydrogen in the weld arc plasma.

3. The apparatus as defined by claim 1 or 2, wherein each of the plurality of optical transducers comprises a hybrid photodiode that internally integrates an amplifier to reduce noise and preserve signal integrity.

4. The apparatus as defined by claim 3, wherein:
   the plurality of optical line filters includes first, second and third optical line filters; and
   the plurality of hybrid photodiodes include first, second and third hybrid photodiodes.

5. The apparatus as defined by claim 4, wherein:
   the first optical line filter passes only electromagnetic radiation having a wavelength substantially 6563 Angstroms (656.3 nanometers);
   the second optical line filter passes only electromagnetic radiation having a wavelength substantially of 6800 Angstroms (680.0 nanometers); and the third optical line filter passes only electromagnetic radiation having a wavelength substantially of 6965 Angstroms (696.5 nanometers).

6. The apparatus as defined by claim 1 or 2, further comprising a heat reflecting member mounted within the optical input housing, the heat reflecting member having an optical axis aligned with the optical axes of the flat window and of the single optical input of the optical fiber bundle, the heat reflecting member being disposed between the flat window and the input end of the optical fiber bundle to reflect a substantial amount of heat generated at the arc welding site and prevent heat damage to the optical fiber bundle.

7. The apparatus as defined by claim 6, wherein the heat reflecting member is a mirror that reflects a substantial amount of weld arc radiation having near-infrared wavelengths greater than 7000 Angstroms and transmits a substantial amount of weld arc radiation having wavelengths between 6000 and 7000 Angstroms.

8. The apparatus as defined by claim 6, further comprising an optical lens mounted within the optical input housing between the flat window and the heat reflecting member, the lens having an optical axis aligned with the common optical axis of the flat window and the heat reflecting member, the lens enhancing the collection of radiation for transmission by the optical fiber bundle during low-radiations conditions.

9. The apparatus as defined by claim 1 or 2, wherein the edge of each of the plurality of optical line filters is coated with a flat black material to minimize the amount of radiation leakage from the edge.

10. The apparatus as defined by claim 9, further comprising a plurality of optical vignetting filters disposed within the optical output housing, each of the vignetting filters being mounted along the common optical axis of and between a different one of the plurality of line filters and its coaxially associated photodiode to block the passage of any radiation that might escape from the edge of any of the plurality of line filters.

11. The apparatus as defined by claim 10, wherein each of the optical vignetting filters has a generally annular configuration and is opaque.

12. The apparatus as defined by claim 1 or 2, further comprising an optical output manifold disposed within the optical output housing to receive and maintain in sequentially mutual contact and coaxial alignment each of the plurality of optical outputs of the output end of the optical fiber bundle, the plurality of line filters, the plurality of vignetting filters, and the plurality of hybrid photodiodes.

13. A method for receiving electromagnetic radiation from a weld arc atmosphere and for generating electrical signals having amplitudes representative of the intensities of the radiation at specific portions of the electromagnetic spectrum thereof, the method comprising the steps of:

providing an optical fiber bundle having a single optical input and a branched output forming three optical outputs, the path distribution of the optical fibers of the bundle being completely randomized to uniformly distribute radiation from the single optical input to each of the three optical outputs;

positioning the single optical input of the optical fiber bundle to receive radiation emissions from the weld arc atmosphere;

filtering the radiation from the first, second and third optical outputs so that only radiation having respective wavelengths equal to that of the hydrogen Balmer series alpha line, representing an average background radiation level, and in the effective emission range of the shield gas are passed; and generating an electrical output signal in response to filtered weld arc radiation emanating from each optical output of the optical fiber bundle, the amplitude of each electrical output signal being representative of the intensity of the respective radiation at the wavelength emanating from that optical output.

14. A method for determining the concentration of hydrogen in a weld arc atmosphere including weld arc plasma and a shield gas, the method comprising the steps of:

providing an optical fiber bundle having a single optical input and a branched output forming three optical outputs, the path distribution of the optical fibers of the bundle being completely randomized to uniformly distribute radiation from the single optical input to each of the three optical outputs;

positioning the single optical input of the optical fiber bundle to receive radiation emissions from the weld arc atmosphere;

filtering the radiation from the first, second and third optical outputs so that only radiation having respective wavelengths equal to that of the hydrogen Balmer series alpha line, representing an average background radiation level, and in the effective emission range of the shield gas are passed;

generating an electrical output signal in response to filtered weld arc radiation emanating from each optical output of the optical fiber bundle, the amplitude of each electrical output signal being representative of the intensity of the respective radiation at the wavelength emanating from that optical output; and determining from the intensities of the emissions, represented by the electric output signals, the concentration of hydrogen in the weld arc atmosphere.

* * * * *